(12) United States Patent
Border et al.

(10) Patent No.: US 8,164,682 B2
(45) Date of Patent: Apr. 24, 2012

(54) DITHERED FOCUS EVALUATION

(75) Inventors: John N. Border, Walworth, NY (US);
Robert M. Guidash, Rochester, NY (US)

(73) Assignee: OmniVision Technologies, Inc., Santa Clara, CA (US)

( * ) Notice: Subject to any disclaimer, the term of this patent is extended or adjusted under 35 U.S.C. 154(b) by 763 days.

(21) Appl. No.: 12/250,589

(22) Filed: Oct. 14, 2008

(65) Prior Publication Data

US 2010/0091169 A1 Apr. 15, 2010

(51) Int. Cl.
*G03B 13/00* (2006.01)
(52) U.S. Cl. .......................................... 348/349; 396/79
(58) Field of Classification Search .................. 348/349; 396/79
See application file for complete search history.

(56) References Cited

U.S. PATENT DOCUMENTS

| | | | |
|---|---|---|---|
| 4,606,630 | A | 8/1986 | Haruki et al. |
| 5,877,809 | A | 3/1999 | Omata et al. |
| 6,441,855 | B1 | 8/2002 | Omata et al. |
| 6,885,819 | B2 | 4/2005 | Shinohara |
| 2001/0026683 | A1 | 10/2001 | Morimoto et al. |
| 2003/0160886 | A1 | 8/2003 | Misawa et al. |
| 2007/0071433 | A1 | 3/2007 | Kawanami |
| 2007/0244359 | A1 | 10/2007 | Cabiri et al. |
| 2008/0002959 | A1 * | 1/2008 | Border et al. ................. 396/111 |
| 2008/0218613 | A1 * | 9/2008 | Janson et al. ................. 348/262 |
| 2008/0219654 | A1 * | 9/2008 | Border et al. .................. 396/89 |
| 2008/0255409 | A1 | 10/2008 | Graumann et al. |
| 2009/0289169 | A1 * | 11/2009 | Yang et al. ................. 250/201.2 |

FOREIGN PATENT DOCUMENTS

| | | |
|---|---|---|
| EP | 1709901 | 10/2006 |
| EP | 1 821 128 A1 | 8/2007 |
| WO | WO-2007051147 | 5/2007 |
| WO | WO 2008/066699 A2 | 6/2008 |

OTHER PUBLICATIONS

European Search Report for Application No. 09740550.0 dated May 30, 2011, 6 pages.

* cited by examiner

*Primary Examiner* — W. B. Perkey
*Assistant Examiner* — Fang-Chi Chang
(74) *Attorney, Agent, or Firm* — Blakely, Sokoloff, Taylor & Zafman

(57) ABSTRACT

The invention utilizes an autofocus system (806) that is capable of very fast changes in focus over a relatively small portion of the focus range of the focusing system. When operating continuously in a repeating series of images or frames such as are found in preview mode or in video capture, autofocus images are captured before and after each video frame wherein the autofocus images have different focus settings than the images in the series. The autofocus images are then evaluated for focus quality to determine whether focus adjustments are needed.

15 Claims, 8 Drawing Sheets

DITHERED FOCUS EVALUATION

FIELD OF THE INVENTION

The invention pertains to the field of autofocus systems for digital cameras. More specifically the invention pertains to the field of autofocus for image capture devices such as digital cameras that can be used for capturing a series of images for video, burst captures, as well as still images.

BACKGROUND OF THE INVENTION

Typically autofocus systems in digital cameras, for capturing still images or video, use a "Through-the-lens" autofocus system that captures a series of 5-20 or more autofocus images taken with a moveable focus lens in different focusing positions. For an autofocus system that includes a variable focus lens with variable focal length or variable optical power for focusing, instead of moving the focus lens, the variable focus lens is adjusted electronically to provide 5-20 or more different focal lengths or optical powers for the autofocus images.

After capture, the 5-20 or more autofocus images are analyzed for contrast to determine the focus lens condition that delivers the image with the highest contrast which is deemed the best focus condition. In the analysis, focus values are generated for each autofocus image based on the level of contrast present. The focus lens is then returned to the focus condition that produced the autofocus image with the highest contrast (highest focus value), or an interpolated position between two or more of the autofocus images, before a final image is captured and stored. This method of autofocusing is known as the "hill climb method" because it generates a sequence of focus values that increase in level until they pass over a peak, i.e., a "hill".

"Through-the-lens" autofocus systems can be very accurate since they measure focus quality directly from autofocus images captured with the same high quality lens that is used to capture the final image. However "through the lens" autofocus systems can also be very slow due to the many movements of the focusing lens required and the many autofocus images that must be captured and analyzed. This slowness in time-to-focus contributes to the objectionable delay perceived by the user between the time when the capture button is pressed and the image is actually captured, which is known as shutter lag. It is desired to reduce shutter lag.

During video capture, the autofocus images are typically derived from the same series of still images or frames that compose the video segment, consequently, the process of autofocusing causes 5-20 or more out-of-focus frames to be produced in the video each time the scene changes. As a result, during video capture with pan movements of the camera where the scene changes continuously, large portions of the video are actually out of focus. Ideally, the autofocus system would be faster when capturing video as well as still images, and in the case of video capture, each frame would be focused so that the number of out of focus frames is reduced. This is especially important in enabling images from videos to be printed or used in other fashions.

Dual lens rangefinder modules can also provide a fast evaluation of focus conditions. Rangefinder modules can be purchased from Fuji Electric in several models such as the FM6260W. Dual lens rangefinder modules contain two lenses that are separated by a distance along with two matching sensor areas to enable matched pairs of low resolution images to be captured. The matched pairs of low resolution images are then analyzed for correlation between the two images to determine the offset between the two images caused by the separation between the two lenses. The offset information is then used along with the lens separation distance to calculate the distance to the scene by triangulation. The calculated distance to the scene is used to guide the use of the focus lens based on a calibration curve established between the distance to the scene as measured by the dual lens rangefinder module and a series of best focused images as produced by the through the lens autofocus system. The response time of the Fuji FM6260W modules is advertised as 0.004 sec in high sensitivity mode, which is well within the 1/30 sec required for video autofocus. However, the accuracy of dual lens rangefinder modules are typically influenced by changes in the environmental conditions such as changes in the temperature and/or humidity. So that typically these dual lens rangefinder modules are not used independently for autofocus in digital cameras but instead are used as a rough focus adjustment that is supplemented by a through the lens contrast based autofocus system. The problem with the dual lens rangefinder modules is that the calibration between the dual lens rangefinder module and the focus lens setting is not stable within the normal operating environment for digital cameras. Environmental conditions such as changes in temperature and humidity can cause the calculated distance to the scene produced by the dual lens rangefinder module to change by over 10% and in addition, the measured position of the moveable lens in the moveable lens control system is prone to environmentally induced changes as well. In addition, the dual lens rangefinder module adds the additional cost to the camera of the dual lens rangefinder module itself.

In a through-the-lens split aperture device, as described United States Patent Publication US20080002959, a split aperture in the lens system is used to create images that can be interpreted for focus information. The split aperture creates two optical paths for the light passing through the lens to create at least two autofocus images at the sensor. By splitting the optical path at the aperture of the lens system, each of the two optical paths creates a full image without shading but reduced light intensity at the image sensor. By sequentially partially blocking two different portions of the aperture thereby splitting the aperture, two optical paths with different perspectives are created. The difference in perspective between the two optical paths causes the autofocus images to be displaced laterally in proportion to the degree of defocus and direction of defocus for an object in the image. However, the focus resolution of the split aperture method as measured by the number of detectable focus zones is limited by the effective separation achieved between the two optical paths that are created which is approximately 40% of the lens aperture. As lens apertures get smaller, the focus accuracy of this technique is diminished due to a lack of focus resolution, this is particularly true for small image capture devices such as are found in compact digital cameras, cellular telephones, laptop computers and other communication devices.

Therefore, a need exists for autofocus systems to be improved to provide less shutter lag for still capture and fewer out-of-focus frames for video while providing the focus resolution to enable accurate focusing.

SUMMARY OF THE INVENTION

It an object of the present invention to provide an autofocus system for image capture that improves upon the above identified problems.

In one embodiment, an autofocus system which is capable of very fast changes in focus over at least a relatively small portion of the focus range of the focusing system is utilized.

When operating continuously in a repeating series of images or frames such as are found in preview mode or in video capture, autofocus images are captured before and after each image in the series wherein the autofocus images have different focus settings than the images in the series. The autofocus images are then evaluated for focus quality and the focus quality data is compared between autofocus images to determine whether focus adjustments are needed for the following image in the series. Focus adjustments are then carried out as needed based on the focus setting for the autofocus image with better focus quality. In this way, focus evaluations and focus adjustments can be accomplished frame by frame with a greatly reduced number of out-of-focus frames being produced when the focus conditions in the scene change.

A variety of autofocus image sets are disclosed. One embodiment uses alternating single step increases and decreases in optical power of the focus lens for first and second sets of autofocus images on either side of the capture of an image in the series. A further embodiment uses alternating multiple step increases and decreases in optical power of the focus lens for first and second sets of autofocus images on either side of the capture of an image in the series. Another embodiment uses alternating first and second steps of increases and decreases in optical power of the focus lens for first and second sets of autofocus images on either side of the capture of sets of images in the series.

DETAILED DESCRIPTION OF THE INVENTION

Figure 1:
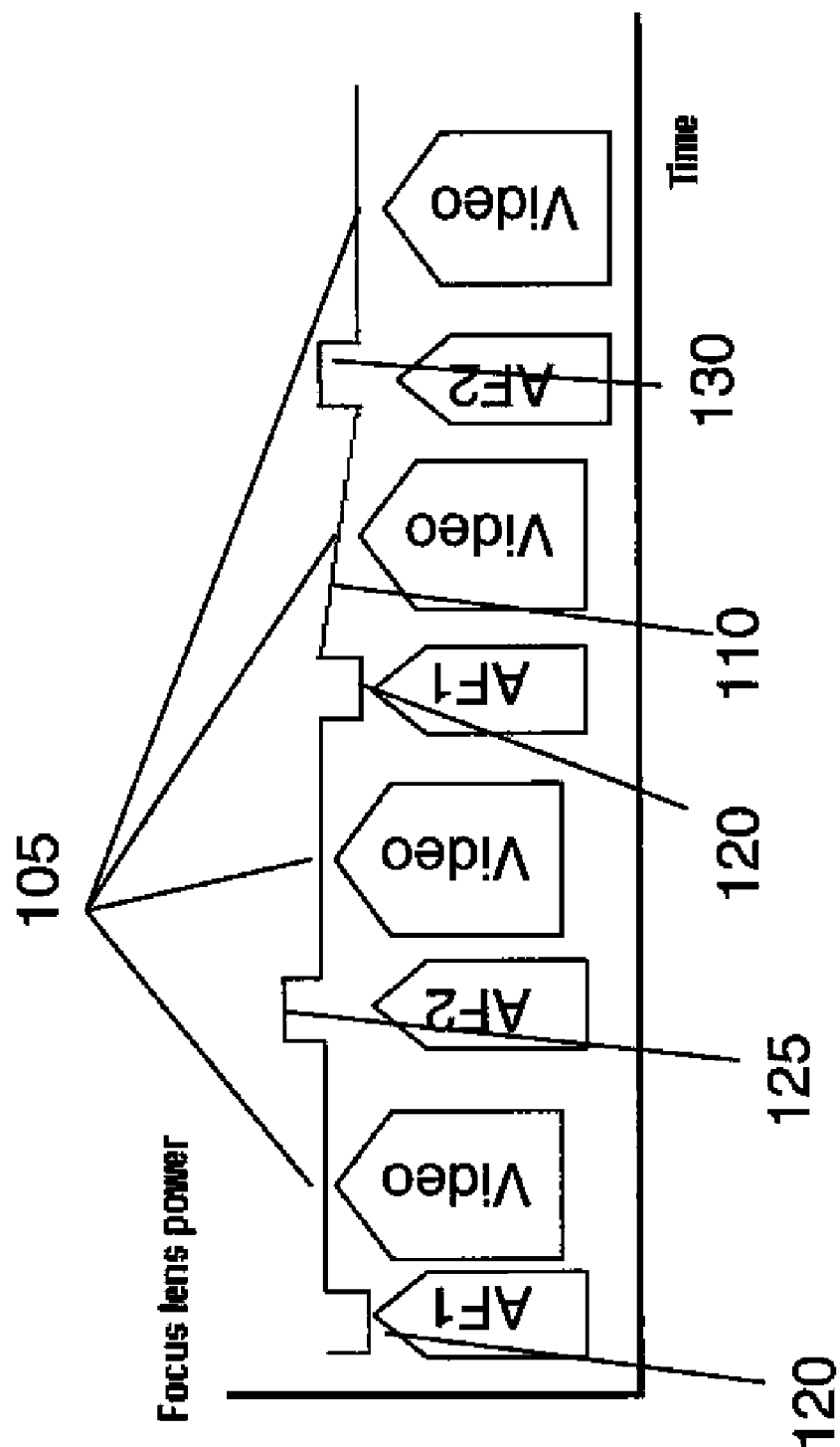
FIG. 1 is an illustration of the optical power of the focus lens vs time using an embodiment of the method of the invention.

Embodiments of the invention seek to provide a fast autofocus system for a camera or other digital image capture device that can make focus evaluations and focus adjustments during the capture of a series of images such as in a video without causing a large number of the images captured to be out-of-focus.

While the invention is described in terms of video capture, the invention is equally applicable to any capture of images in a series such as would occur for example in burst capture modes or in the capture of the images for preview display on an image capture device, etc. To this end, embodiments of the invention add the capture of one or more autofocus images in-between the capture of each video image wherein, the autofocus image(s) is captured with a different focus setting than the video image. Since the focus quality is evaluated between each video frame, the conditions within the scene do not change a large amount frame to frame so the focus evaluation of the invention can be done with a small number of autofocus images.

For autofocus to become fast enough to approach frame-by-frame autofocus at the typical video frame rate of 30 frames/second or faster, several improvements are needed throughout the autofocus system. First, a focus measurement system is needed that can provide a measure of focus quality that can be completed within $\frac{1}{30}$ second or faster. The focus measurement must provide enough information to accurately guide the change in focus of the focus lens to achieve the desired focus quality within $\frac{1}{30}$ second as well. Second, the focus lens control system must be fast enough to make focus adjustments within the available $\frac{1}{30}$ sec between frames. There are a number of fast focus systems available that can be used to make focus adjustments within $\frac{1}{30}$ sec. Examples of suitably fast focus systems that can be used for focus lenses in the invention include but are not limited to: piezoelectric motors for moving focus lenses; liquid lenses for variable optical power of focus lenses; fluid lenses for variable optical power of focus lenses; electroactive polymer lenses for variable optical power of focus lenses and dual range liquid crystal lenses for variable optical power of focus lenses as described in copending United States patent application by John N. Border, et al. filed on Sep. 25, 2008, entitled "Dual Range Focus Element" and which is hereby incorporated by reference as if fully set forth herein.

A fast focus system is used in one embodiment to rapidly adjust the focus lens in an alternating manner between the focus setting for the video image and the focus settings for the autofocus images. The capture of the autofocus images must be rapid enough to not interfere with the capture of the video images, but at the same time, the autofocus images must have sufficient image quality to enable focus quality to be determined so that decisions on focus adjustments can be made for captures of video images.

FIG. 1 shows an illustration of the operation of the optical power of the focus lens using the method of one embodiment of the invention. In this case, autofocus images 120 (labeled as AF1) and 125 (labeled as AF2) are captured between captures of video images 105 (labeled as Video) wherein the autofocus images are captured in a first set 120 followed by a second set 125. Prior to the capture of each autofocus image, the focus lens is changed to a different focus setting from the video capture. As shown in FIG. 1, the first autofocus image set 120 has a focus setting with lower optical power and the second autofocus image set 125 has a focus setting with a higher optical power. The change between the focus settings for the autofocus images 120 and 125 and the focus setting for the video images 105 is chosen to be an amount that causes the same amount of defocus but in opposite directions of defocus as compared to the focus setting for the video image that separates the autofocus images.

For simplicity the change in optical power from the focus setting for the video frame to the first set of autofocus images and the second set of autofocus images is shown as being the same in FIGS. 1, 4, 5, 6 but the actual optical power change can be different to produce the same amount of defocus for the first set of autofocus images and the second set of autofocus images based on the focusing characteristics of the focus lens and the lens assembly. Since the focus settings for the autofocus images 120 and 125 bracket the focus setting for the video image 105, if the video image is well focused, the autofocus images 120 and 125 will be equally defocused. Consequently, when the autofocus images from the 2 sets 120 and 125 are compared to one another for focus quality, if the video image 105 that was captured between the autofocus images 120 and 125 was in focus, the focus quality of the 2 sets of autofocus images 120 and 125 will be the same.

Conversely, if the video image 105 is not well focused, the focus quality of one of the autofocus image sets 120 or 125 will be better than the focus quality of the other autofocus image set. In the invention, it is this difference in focus quality between the 2 sets of autofocus images 120 and 125 that is used to determine whether a focus adjustment is needed before the next video image 105 is captured. In addition, the degree of difference in focus quality between the 2 sets of autofocus images 120 and 125 is used to determine the amount of focus adjustment that is applied to improve the focus quality of the next video image 105. A decision on whether a focus adjustment is needed for video frame capture 105 can be made using the process illustrated in FIG. 1 after 1 set of first set autofocus images 120, 1 set of second set autofocus images 125 and 1 video frame 105 has been captured.

After a decision on whether a focus adjustment is needed for video frame capture 105, the focus adjustment can be carried out during the next video frame capture 105 as shown in FIG. 1, where an optical power change 110 is shown during the video frame capture 105. Alternately, the focus adjustment can be carried out in conjunction with the optical power changes for the autofocus images. The focus change for the autofocus image set 130 that follows the focus adjustment 110, is the same amount as before the focus adjustment but the change is now relative to the new focus setting at the end of the video image 105 that was just captured so the optical power for the autofocus image set 130 is different from the previous autofocus set 125.

Figure 2:
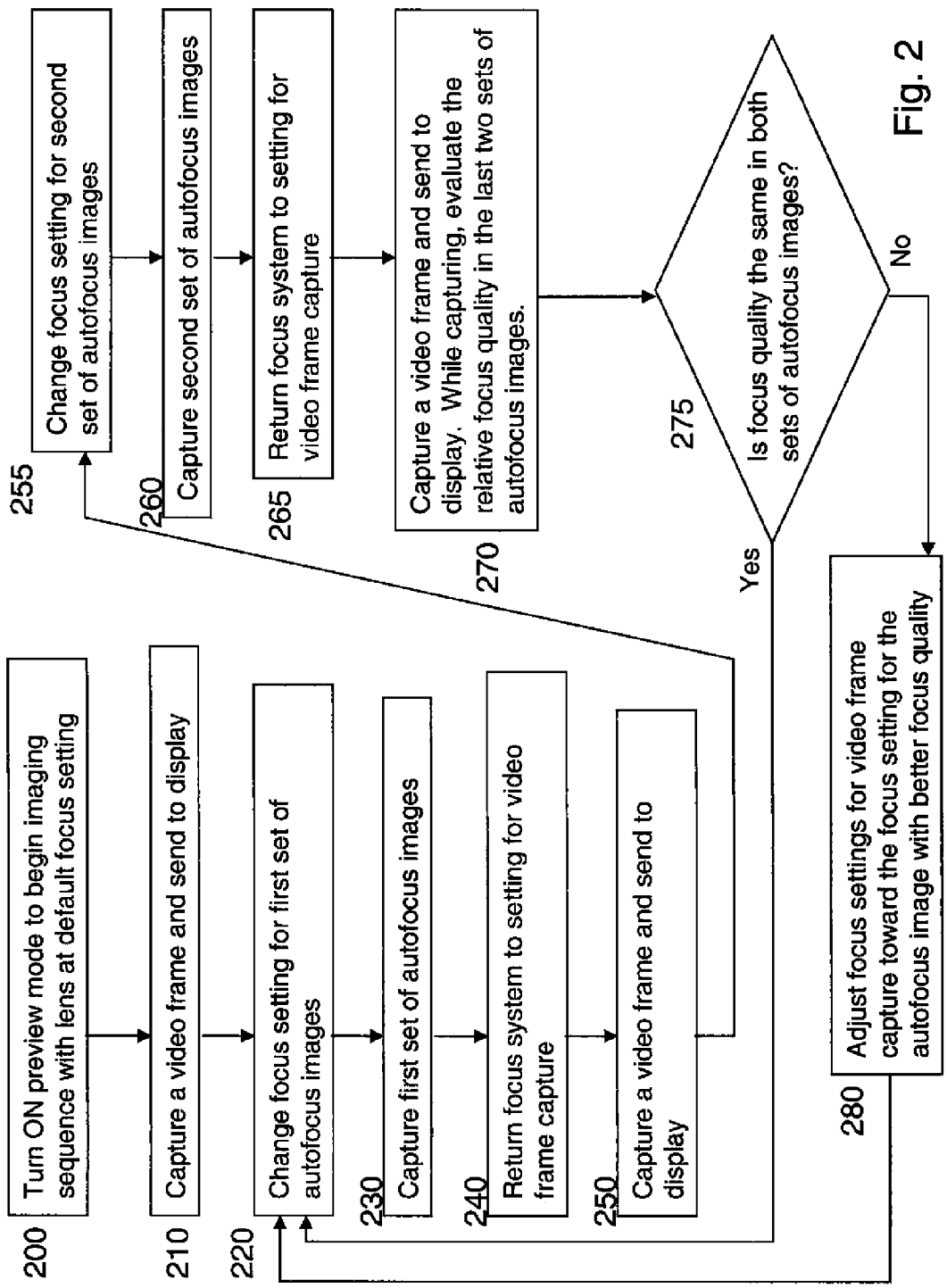
FIG. 2 is a flow chart for the method of the invention as used when the camera or other image capture device is used in a preview mode.

FIG. 2 shows a flowchart of one embodiment of the method of the invention as used when the camera is in a preview mode where images are captured and immediately displayed. The process begins in 200 when the camera or digital capture device is turned ON with the camera in a default focus setting. In 210, a video frame is captured and sent to the display. In 220, the focus setting is changed by an amount (for example 1 diopter or, the amount as corresponds to the depth of field of the lens e.g. 1 focus zone, at that focus setting) for the capture of a first set of autofocus images. In 230, the first set of autofocus images are captured and temporarily stored. The focus system is then returned to the setting for video frame capture in 240. In 250, another video frame is captured and sent to the display. The focus setting is then changed by a second amount for the capture of a second set of autofocus images in 255.

A second set of autofocus images is then captured in Step 260 and temporarily stored. The focus system is then returned to the setting for video frame capture in 265. In 270, another video frame is captured and sent to the display. While capturing the video frame in 270, the focus quality of the first and second sets of autofocus images are evaluated and focus values are produced for each autofocus image. Wherein techniques for evaluating a series autofocus images to produce focus values are well known in the art, example techniques can be found in U.S. Pat. Nos. 5,877,809, 6,441,855, 6,885,819 and United States Patent Application 2003/0160886. In 275, a decision is made based on whether the focus values for the first and second autofocus sets is the same within a selected threshold value. If the difference between the focus values of the first and second autofocus sets is less than the selected threshold value, the process proceeds to 220. If the focus value of either the first or second set of autofocus images is higher (better focus quality) than the other and outside the threshold value, a defocus condition has been detected and the focus setting for subsequent video frame captures is adjusted toward the focus setting of the autofocus image set which has better focus quality in 280 and the process proceeds to 220.

In the focus setting adjustment process, the rate of focus setting adjustment to correct for a detected defocus condition is selected based on the focus characteristics of the fast focus system and the imaging system of the camera. The rate of focus setting adjustment can be programmed into the autofocus system based on a calibration process performed during manufacturing. Alternately, the rate of focus setting adjustment can be progressively learned by the autofocus system during use based on the number of focus setting adjustments required to attain a stable degree of good focus quality.

It should be noted that the process of the invention in one embodiment for autofocus of a burst capture will follow a process flow that is similar to that shown in FIG. 2 where the video images are instead burst images. In addition, the burst images are sent to storage instead of being sent to the display.

It should also be noted that the process of the invention in another embodiment for focusing in the preview mode as described in FIG. 2 also applies to focusing for still image captures. In this case, the camera is placed into preview mode prior to capture of the still image and the camera continues to focus itself in the preview mode as the scene content changes. The camera is then already focused when the operator pushes the capture button thereby instructing the camera to capture a still image.

Figure 3:
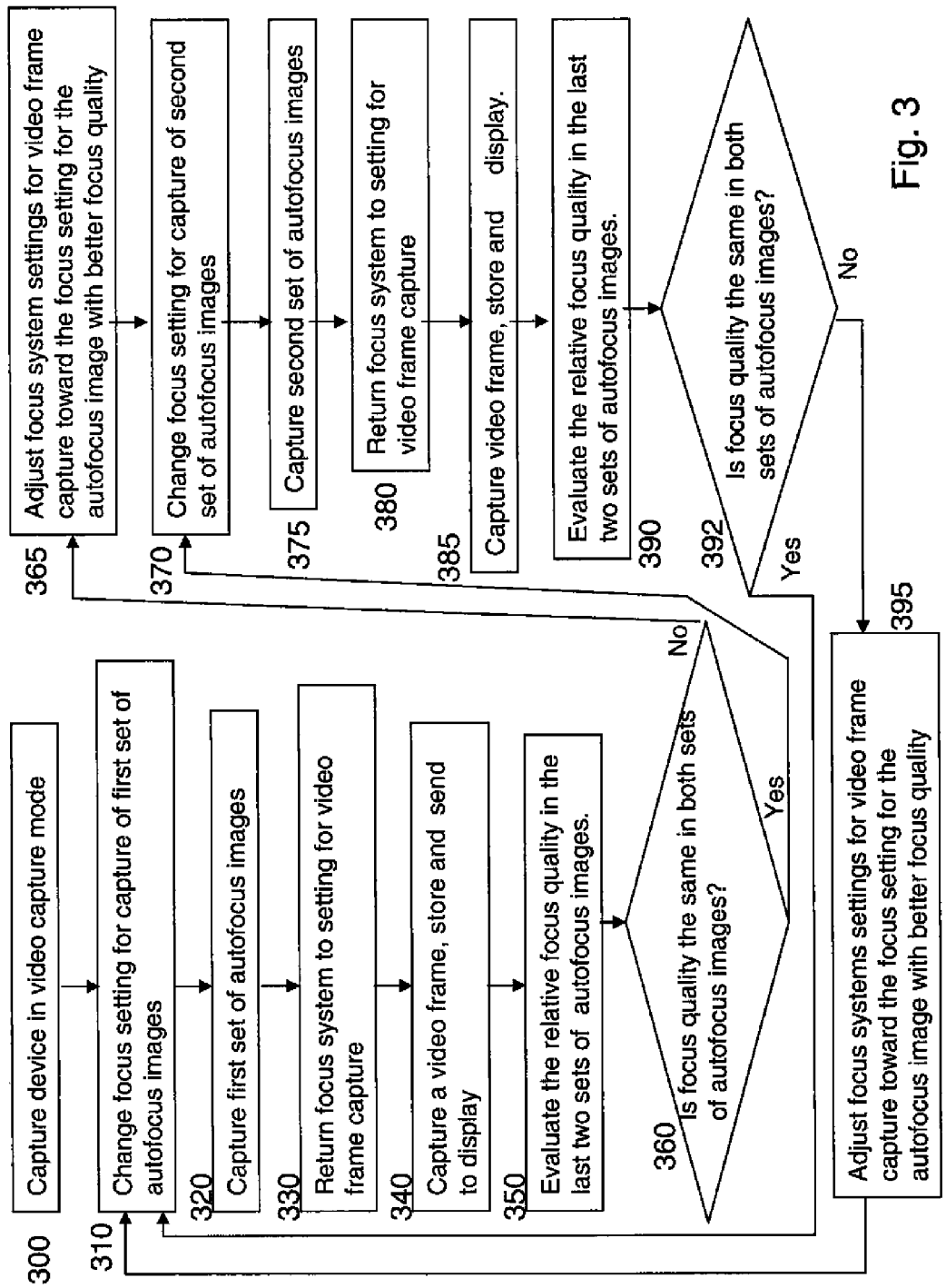
FIG. 3 is a flow chart for the method of the invention as used when the camera or other image capture device is used in a continuous mode for video capture.

FIG. 3 shows a flow chart for another embodiment of method of the invention for ongoing continuous video capture. The process begins with the camera already in operation in a video mode as stated in 300. In 310, the focus setting is changed by an amount for capture of a first set of autofocus images. A first set of autofocus image is then captured in 320 and temporarily stored. The focus system is then returned to settings for video frame capture in 330. In 340, a video frame is captured, stored and typically sent to the display, although the sending of the video frame to the display is not required by the invention. The relative focus quality, determined through focus values for the first and second sets of autofocus images is determined in 350. A decision is then made in 360 based on whether the first and second sets of autofocus images have the same focus values (relative focus quality) within a threshold value. If the relative focus quality of the first and second sets of autofocus images is within the selected threshold value, the process continues on to 370. Where at 370 the focus setting is changed by an amount for capture of the second set of autofocus images. The second set of autofocus images are captured in 375. The focus system is then returned to focus settings for video frame capture in 380. A video frame is captured at 385, stored and typically sent to the display.

The relative focus quality is evaluated through determined focus values for the last sets of the first set of autofocus images and the second set of autofocus images in 390. A decision on process direction is reached in 392 based on whether the last sets of the first set of autofocus images and the second set of autofocus images have the same focus values (relative focus quality) within a selected threshold value. If the last sets of the first set of autofocus images and the second set of autofocus images have the same focus values within the selected threshold value, the process loops back to Step 310. If either the first set of autofocus images or the second set of autofocus images have a higher focus value (better relative focus quality), above the selected threshold value, the process proceeds to 395. Where in 395, the focus system settings for video fame capture are adjusted toward the focus setting for the autofocus image set which has the better focus quality and the process loops back to 310.

If at 360, the relative focus quality of either the set of first autofocus images or the set of second autofocus images is determined to have a higher focus value (better focus quality) beyond the threshold value, the process proceeds to Step 365. Where at 365 the focus system settings are adjusted toward the focus settings for the set of autofocus images which produced better focus quality, and the process proceeds on to 370 as previously described.

Figure 4:
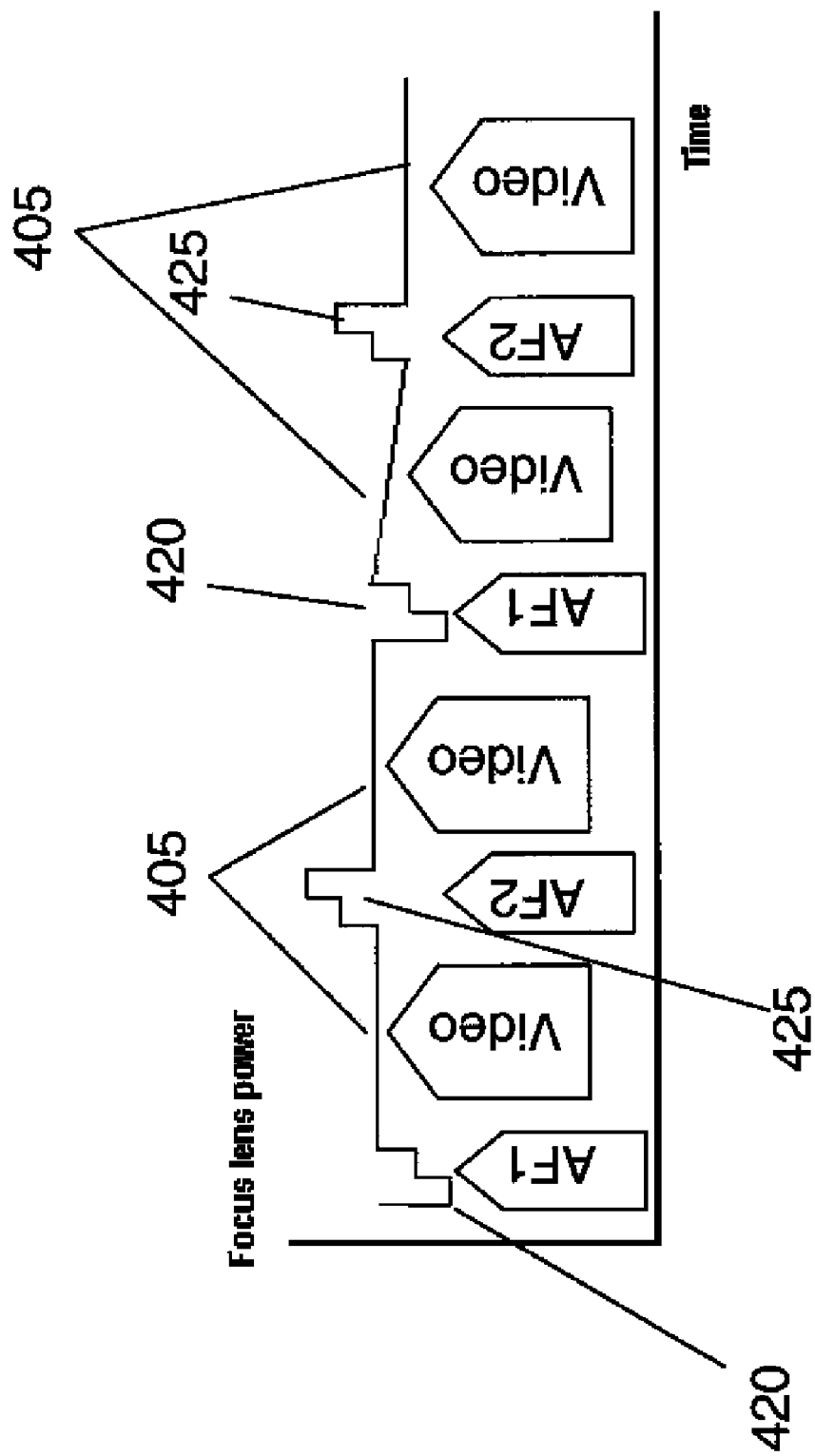
FIG. 4 is an illustration of the optical power of the focus lens vs time using another embodiment of the method of the invention.

FIG. 4 shows an illustration of another embodiment of the method of the invention where multiple autofocus images are included in both the first set of autofocus images and the second set of autofocus images. In this embodiment, the first set of autofocus images 420 (labeled as AF1) is comprised of multiple images with decreasing steps of optical power while the second set of autofocus images 425 (labeled as AF2) is comprised of multiple images with increasing steps of optical power. This embodiment enables a decision to be made as to whether a focus adjustment is needed for video frame 405 (labeled as Video) capture after 1 set of first set autofocus images 420, 1 set of second set autofocus images 425 and 1 video frame 405 have been captured. In addition, since multiple autofocus images with different focus settings are captured within the first and second sets of autofocus images 420 and 425, the measure of focus values (relative focus quality) that is produced is increased in accuracy.

Figure 5:
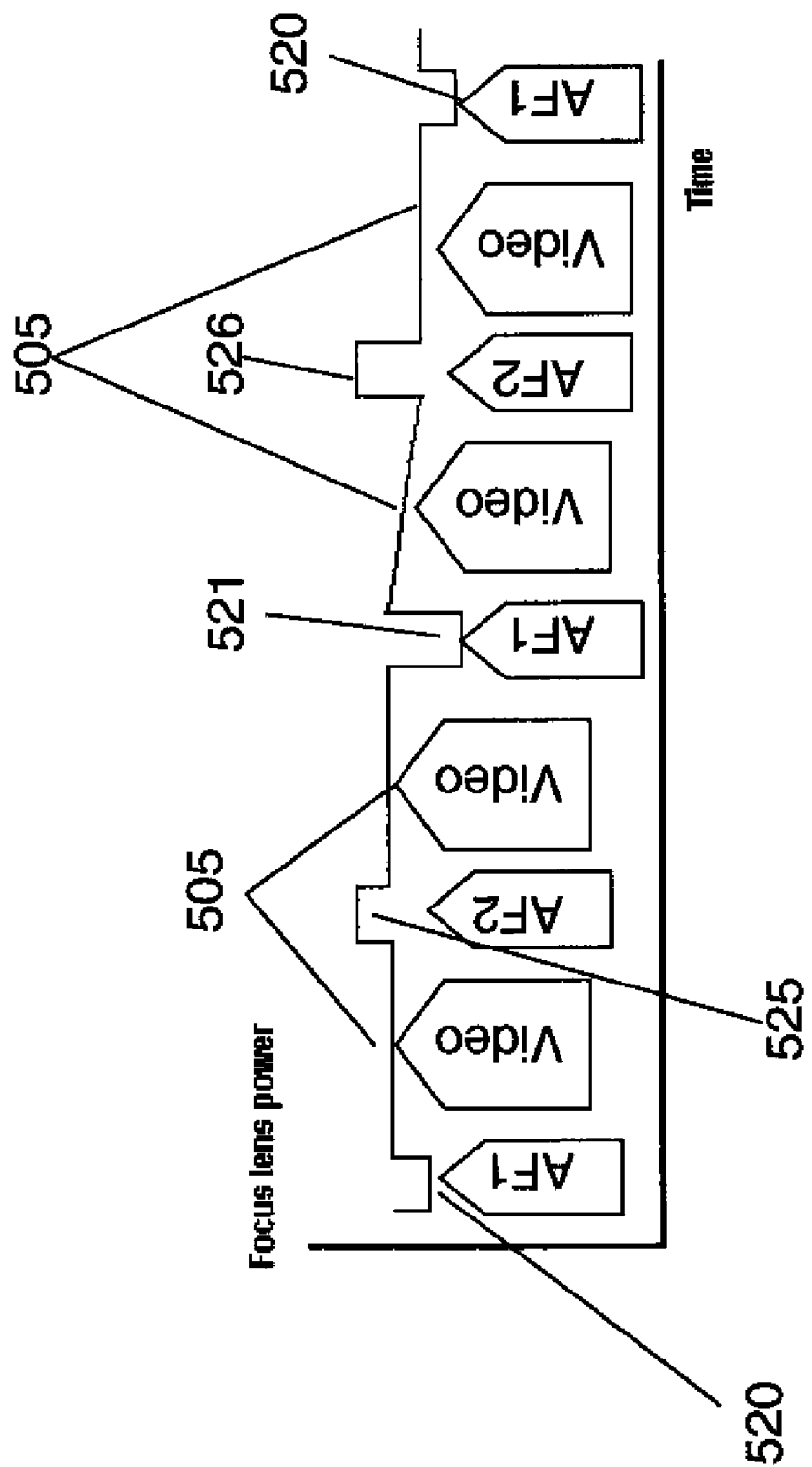
FIG. 5 is an illustration of the optical power of the focus lens vs time using a further embodiment of the method of the invention.

FIG. 5 shows an illustration of a further embodiment of the method of the invention in which the amount of change in optical power for autofocus images changes from set to set. In this case, a decision on focus quality is not reached until after 2 sets of first set of autofocus images 520 and 521 (labeled as AF1) and 2 sets of second set autofocus images 525 and 526 (labeled as AF2) and 2 video frames 505 (labeled as Video) have been captured. The need to make focus adjustments for video frame captures is then determined by comparing the relative focus quality of the 2 sets of first set autofocus images 520 and 521 to the 2 sets of second set autofocus images 525 and 526. While this embodiment produces more out-of-focus video frames, since the first (520 and 521) and second (525 and 526) sets of autofocus images only capture 1 autofocus image between each video capture, the exposure time for each autofocus image can be increased to reduce noise in the autofocus image and yet multiple autofocus images are evaluated to determine whether a focus adjustment is needed for video frame capture, so a higher focus accuracy is produced.

Figure 6:
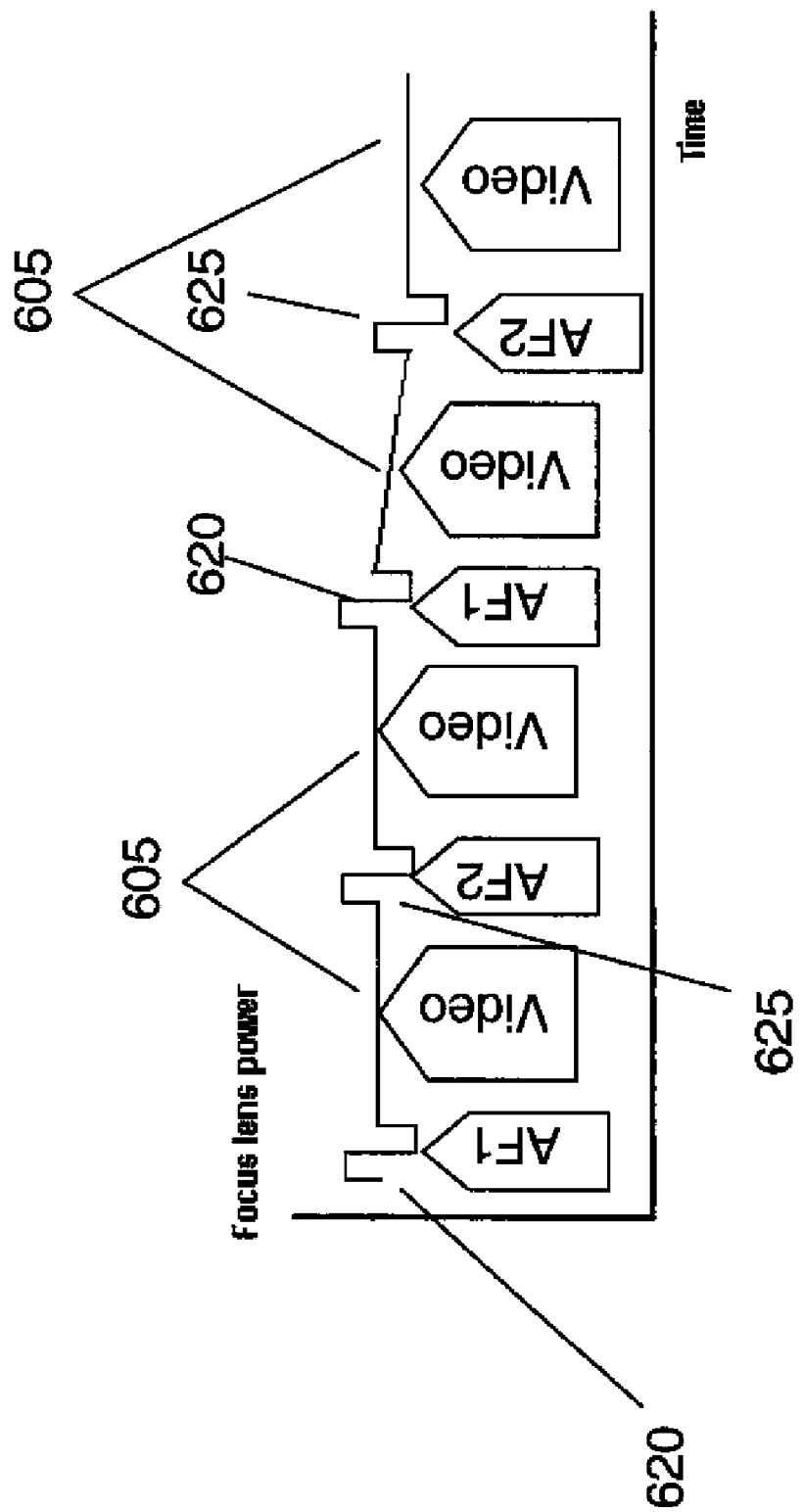
FIG. 6 is an illustration of the optical power of the focus lens vs time using yet another embodiment of the method of the invention.

FIG. 6 shows an illustration of a further embodiment of the method of the invention, wherein the first set of autofocus images 620 (labeled as AF1) and second set of autofocus images 625 (labeled as AF2) are the same and each includes decreasing and increasing steps of optical power. While the illustration of FIG. 6 shows one decreasing step and one increasing step, the number of decreasing and increasing steps in each set of autofocus images 620 or 625 could be more than one each. In this embodiment, a decision as to whether a focus adjustment is needed for video frame 605 (labeled as Video) capture can be reached after one set of autofocus images 620 or 625 has been captured, the focus adjustment can then be implemented during the capture of the following video frame 605. This approach provides a further reduction in the number of out-of-focus video frames 605 produced because the defocus condition is detected faster.

It should be noted that a focus evaluation using a process similar to that shown in FIG. 6 is possible for verification of focus prior to capture of a still image. In this case, the camera would focus itself in the preview mode as described in the flowchart of FIG. 2, then when the operator pushes the capture button instructing the camera to capture a still image, a final evaluation of focus quality could be achieved by capturing several autofocus images with increasing and decreasing optical power of the focus lens. The autofocus images are then evaluated for relative focus quality and a decision is made as to whether a final focus adjustment is needed prior to capture of the still image.

Figure 7:
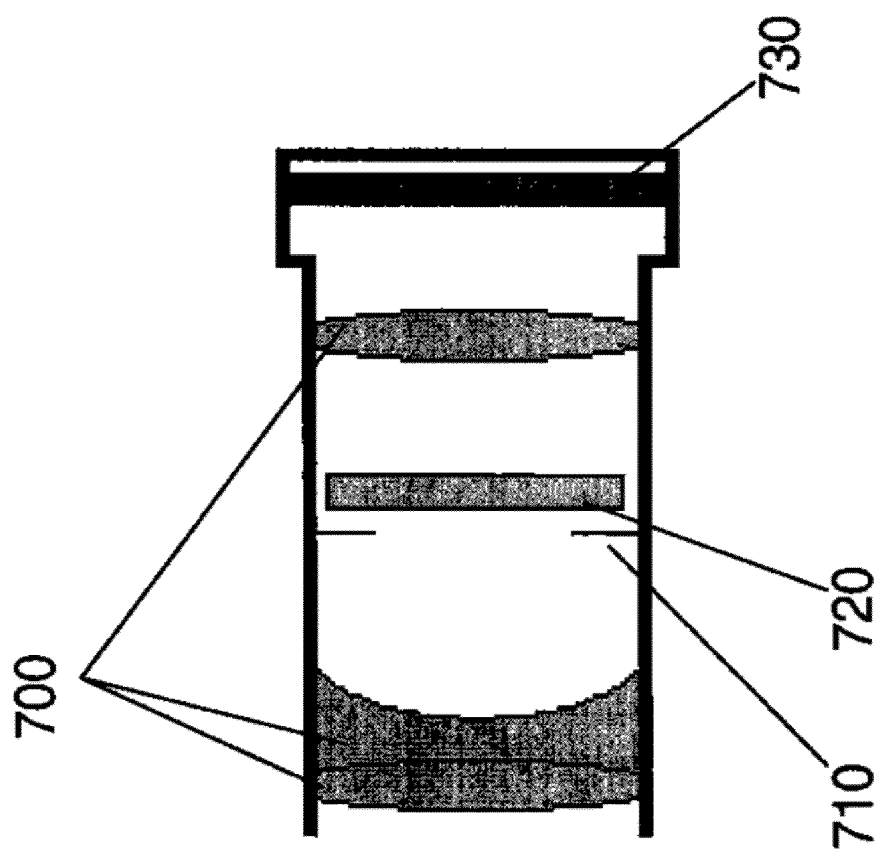
FIG. 7 is a schematic cross section of an image capture device for a system embodiment of the invention.

In a yet further embodiment of the invention, a focus system is disclosed that provides for short exposure time and rapid readout of autofocus images to support the method described previously. FIG. 7 shows an illustration of an image capture device that includes features of the invention. The invention includes different types of rapid captures of autofocus images. Rapid captures of autofocus images require short exposure times and fast readout from the image sensor. Therefore, the focus system of the invention includes a lens assembly 700 that includes a focus lens 720 that is capable of rapid changes in optical power, 0.01 sec or less for a 1 diopter change as an illustrative example. Wherein the focus lens 720 is shown positioned behind the aperture stop 710, as that is the position which typically produces the shortest overall length of the image capture device. Other positions of the focus lens 720 or the aperture stop 710 are possible within the scope of the invention such as at the end of the lens where light enters.

To increase the efficiency of light gathering by the image sensor 730, an image sensor is used which has panchromatic pixels which gather light from across the entire visible light spectrum as described in United States Patent Application 2007/0024931, filed on Jul. 28, 2005, entitled "Image Sensor with Improved Light Sensitivity", which is incorporated by reference as if fully set forth herein. For higher light sensitivity and faster capture times, the autofocus images can be comprised of panchromatic pixels exclusively that are readout in a subsampled manner. In addition, the sensor should be capable of readout of portions of the sensor to reduce the number of pixels that are readout in each image. In this way, autofocus images can be comprised of detected regions of interest such as faces or identified objects within the scene that is being imaged. The sensor should also be capable of binned readout of the pixels. Where binning is done by connecting neighboring pixels together electrically so the collected charge is shared amongst the binned pixels thereby increasing the effective size of the pixels and increasing the sensitivity of the pixels to light.

Figure 8:
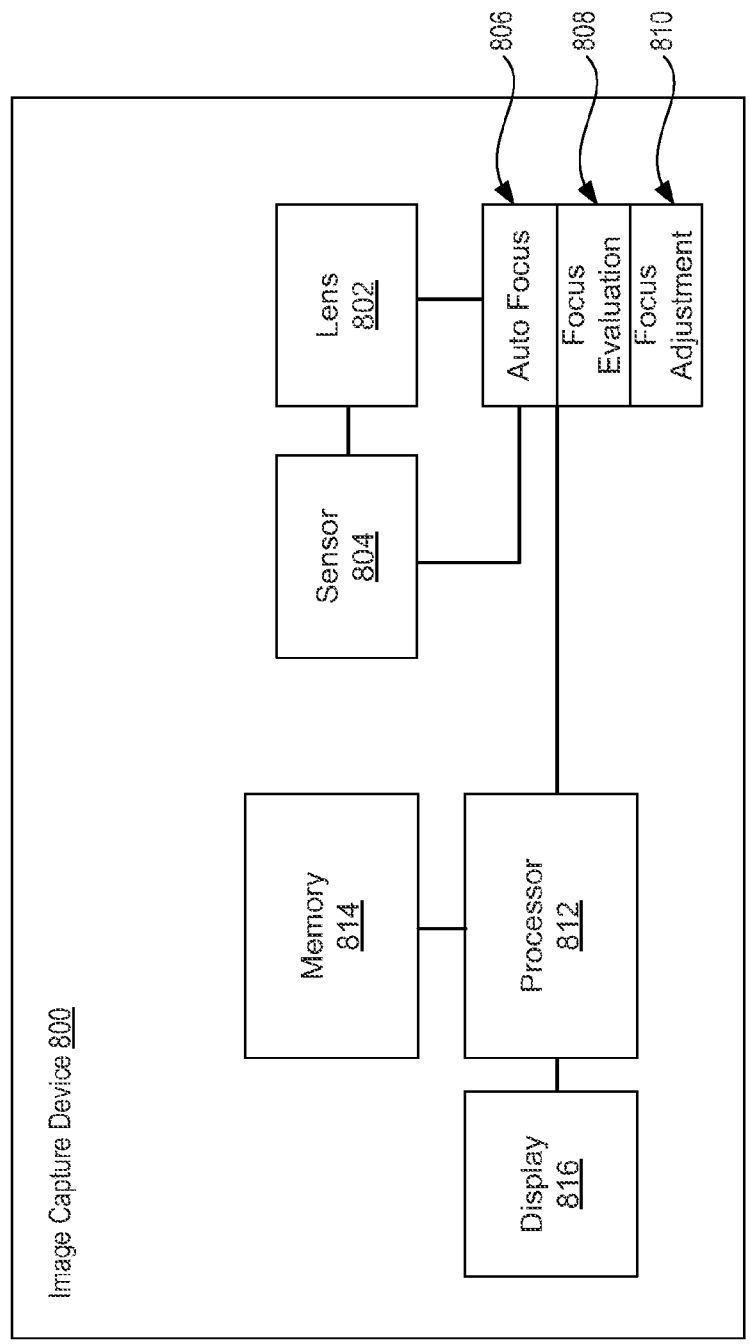
FIG. 8 is a simplified block diagram of an image capture device that can take advantage of the dithered focus evaluation in accordance with an embodiment of the invention.

Referring to FIG. 8, there is shown a simplified block diagram of an image capture device 800 such as a digital still camera, video camera, etc. Camera 800 includes a focus lens system such as lens 700. A sensor which can take the form of a CMOS or CCD image sensor as know in the art as for example image sensor 730 can be utilized with the present invention. An auto focus system 806 includes a focus evaluation section/circuit that can perform the focus evaluation as previously described and a focus adjustment section/circuit that performs the focus adjustment as described previously. Sections 808 and 810 can comprise hardware, software or a combination of both depending on the intended design requirements.

A processor 812 which acts as the controller for camera 800 can comprise any one of a number of microprocessors, microcontrollers, digital signal processors, etc. Controller 812 in one embodiment performs all of the autofocus techniques described above in collaboration with autofocus system 806. Memory 814 which can include both volatile and nonvolatile memory stores data as well as the necessary programs used to operate camera 800. A display 816 which can comprise a Liquid Crystal Display (LCD) 816 can present images that are currently being captured as well as images previously captured as known in the art.

The invention has been described in detail with particular reference to certain preferred embodiments thereof, but it will be understood that variations and modifications can be effected within the spirit and scope of the invention.

Parts List

- 105 Video frame
- 110 Focus adjustment during a video frame
- 120 Autofocus image in first set of autofocus images
- 125 Autofocus image in second set of autofocus images
- 130 Autofocus image in first set of autofocus images after a focus adjustment for video capture
- 200 Process Block
- 210 Process Block
- 220 Process Block
- 230 Process Block
- 240 Process Block
- 250 Process Block
- 255 Process Block
- 260 Process Block
- 265 Process Block
- 270 Process Block
- 275 Process Block
- 280 Process Block
- 300 Process Block
- 310 Process Block
- 320 Process Block
- 330 Process Block
- 340 Process Block
- 350 Process Block
- 360 Process Block
- 365 Process Block
- 370 Process Block
- 375 Process Block
- 380 Process Block
- 385 Process Block
- 390 Process Block
- 392 Process Block
- 395 Process Block
- 405 Video frame
- 420 Autofocus image in first set of autofocus images
- 425 Autofocus image in second set of autofocus images
- 505 Video frame
- 520 First autofocus image in first set of autofocus images
- 521 Second autofocus image in first set of autofocus images
- 525 First autofocus image in second set of autofocus images
- 526 Second autofocus image in second set of autofocus images
- 605 Video frame
- 620 Autofocus image in first set of autofocus images
- 625 Autofocus image in second set of autofocus images
- 700 Lens assembly
- 710 Aperture stop
- 720 Focus lens
- 730 Image sensor
- 800 Image capture device
- 802 Lens
- 804 Sensor
- 806 Auto Focus section
- 808 Focus evaluation section
- 810 Focus adjustment section
- 812 Processor
- 814 Memory
- 816 Display

The invention claimed is:

1. A method for auto focusing an image capture device that can capture images with different focus settings, wherein the method comprises:
    capturing a first set of one or more autofocus images with a first focus setting;
    capturing a first video image with a second focus setting after capturing the first set;
    capturing a second set of one or more autofocus images with a third focus setting, wherein the second focus setting is between the first and third focus settings and wherein the second set is captured after capturing the first video image;
    evaluating a difference in focus quality between the first and second sets of autofocus images;
    adjusting a fourth focus setting for a second video image based on the difference in focus quality between the first and second sets of autofocus images; and
    capturing the second video image using the adjusted fourth focus setting.

2. The method of claim 1, wherein the first and the third focus settings are selected to effect substantially a same amount of defocus as compared to the second focus setting, but in opposite directions.

3. The method of claim 2, wherein adjusting the focus setting for the second video image comprises:
    selecting the second focus setting used to capture the first video image when the difference in focus quality between the first and second sets of autofocus images is below a predetermined threshold; and
    adjusting the fourth focus setting used to capture the second video image in the direction toward the first and second focus settings for the first and second sets of the autofocus images based on which of the first and second sets of the autofocus images is evaluated to have a better focus quality.

4. An image capture device, comprising: a focus lens; a sensor located in the optical path of the focus lens; an autofocus system coupled to the focus lens for adjusting focus of the focus lens; the autofocus system to capture a first set of one or more autofocus images with a first focus setting; the autofocus system to capture a first video image with a second focus setting after capturing the first set; the autofocus system to capture a second set of one or more autofocus images with a third focus setting, wherein the second focus setting is between the first and third focus settings and wherein the second set is to be captured after the capture of the first video image; and wherein the autofocus system further comprises: a focus evaluation section to evaluate the difference in focus quality between the first and second sets of autofocus images; a focus adjustment section responsive to the evaluation section to adjust a fourth focus setting for a second video image based on the difference in focus quality between the first and second sets of autofocus images; and a memory to store the second video image captured using the adjusted fourth focus setting.

5. The system of claim 4, wherein the first and the third focus settings are selected to effect substantially a same amount of defocus as compared to the second focus setting, but in opposite directions.

6. The system of claim 5, wherein the autofocus system to adjust the focus setting for the second video image comprises: the autofocus system to select the second focus setting used to capture the first video image when the difference in focus quality between the first and second sets of autofocus images is below a predetermined threshold; and the autofocus system to adjust the fourth focus setting used to capture the second video image in the direction toward the first and second focus settings for the first and second sets of the autofocus images based on which of the first and second sets of the autofocus images is evaluated to have a better focus quality.

7. The system of claim 4, wherein the focus lens comprises one of:
   a moveable focus lens having multiple different focusing positions for auto-focusing; and
   a variable focus lens with variable focal length or variable optical power for focusing, wherein the variable focus lens is adjusted electronically instead of moving the focus lens, to provide multiple different focal lengths or multiple different optical powers for auto-focusing.

8. A method for auto focusing comprising:
   capturing a first set of autofocus images with a first focus setting, the first set comprised of multiple images each with decreasing steps of optical power;
   capturing a first video image with a second focus setting after capturing the first set;
   capturing a second set of autofocus images with a third focus setting, the second set comprised of multiple images each with increasing steps of optical power, wherein the second set is captured after capturing the first video image;
   evaluating a difference in focus quality between the first and second sets of autofocus images;
   adjusting a fourth focus setting for a second video image based on the difference in focus quality between the first and second sets of autofocus images; and
   capturing the second video image using the adjusted fourth focus setting.

9. The method of claim 8, wherein adjusting the fourth focus setting for the second video image further comprises making a decision as to whether a focus adjustment is needed for the second video image after capturing the first set of autofocus images, after capturing the first video image, and after capturing the second set of autofocus images.

10. A method for auto focusing comprising: capturing a first autofocus image of a first set with a first focus optical power setting; capturing a first video image with a second focus optical power setting after capturing the first autofocus image of the first set; capturing a first autofocus image of a second set with a third focus optical power setting, wherein the first autofocus image of the second set is captured after capturing the first video image; capturing a second video image with the second focus optical power setting used for the first video image; capturing a second autofocus image of the first set with a fifth focus optical power setting; capturing a third video image with the second focus optical power setting used for the first and second video images; capturing a second autofocus image of the second set with a sixth focus optical power setting; evaluating a difference in focus quality between the first and second sets; adjusting a seventh focus optical power setting for a third video image based on the difference in focus quality between the first and second sets; and capturing the third video image using the adjusted seventh focus optical power setting.

11. The method of claim 10, wherein the first and fifth focus optical power settings used to capture the first set are less than the third and sixth focus optical power settings used to capture the second set.

12. The method of claim 10:
   wherein the first focus optical power setting used to capture the first image of the first set is greater than the fifth focus optical power setting used to capture the second image of the first set; and
   wherein the sixth focus optical power setting used to capture the second image of the second set is greater than the third focus optical power setting used to capture the first image of the second set.

13. A method for auto focusing comprising: capturing a first set of autofocus images, the first set comprising at least a first autofocus image of the first set captured at a first focus setting of decreased optical power and further comprising at least a second autofocus image of the first set captured at a second focus setting of increased optical power; capturing a first video image with a third focus setting after capturing the first set; capturing a second set of autofocus images, the second set comprising at least a first autofocus image of the second set captured at the first focus setting of decreased optical power used to capture the first autofocus image of the first set, wherein the second set further comprises at least a second autofocus image of the second set captured at the second focus setting of increased optical power used to capture the second autofocus image of the first set, and wherein the second set of autofocus images is captured after capturing the first video image; evaluating a difference in focus quality between the first and second sets of autofocus images; adjusting a fourth focus setting for a second video image based on the difference in focus quality between the first and second sets of autofocus images; and capturing the second video image using the adjusted fourth focus setting.

14. The method of claim 13, wherein capturing the first and second sets of autofocus images comprises rapid captures of autofocus images with short exposure times and fast readout of the autofocus images from the image sensor.

15. The method of claim 13, wherein the first and second sets of autofocus images are captured through a focus lens that implements rapid changes in optical power at 0.01 seconds or less per a 1 diopter change.

* * * * *